United States Patent
Hupka et al.

(10) Patent No.: US 9,920,175 B2
(45) Date of Patent: Mar. 20, 2018

(54) POLYURETHANE PREPREG AND COMPOSITE FIBER ELEMENT PRODUCED THEREFROM

(71) Applicant: Covestro Deutschland AG, Leverkusen (DE)

(72) Inventors: Florian Hupka, Düsseldorf (DE); Marcel Schornstein, Neuss (DE); Hartmut Nefzger, Pulheim (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 248 days.

(21) Appl. No.: 14/785,218

(22) PCT Filed: Apr. 14, 2014

(86) PCT No.: PCT/EP2014/057490
§ 371 (c)(1),
(2) Date: Oct. 16, 2015

(87) PCT Pub. No.: WO2014/170252
PCT Pub. Date: Oct. 23, 2014

(65) Prior Publication Data
US 2016/0145403 A1 May 26, 2016

(30) Foreign Application Priority Data
Apr. 19, 2013 (EP) .................................... 13164574

(51) Int. Cl.
| | | |
|---|---|---|
| C08J 5/24 | (2006.01) | |
| B32B 27/04 | (2006.01) | |
| B32B 27/40 | (2006.01) | |
| C08G 18/10 | (2006.01) | |
| C08G 18/76 | (2006.01) | |
| C08G 18/20 | (2006.01) | |
| C08G 18/42 | (2006.01) | |
| C08J 5/04 | (2006.01) | |
| C08L 75/08 | (2006.01) | |

(52) U.S. Cl.
CPC ................ C08J 5/24 (2013.01); C08G 18/10 (2013.01); C08G 18/2063 (2013.01); C08G 18/4238 (2013.01); C08G 18/7664 (2013.01); C08J 5/043 (2013.01); C08J 2375/06 (2013.01)

(58) Field of Classification Search
None
See application file for complete search history.

(56) References Cited

U.S. PATENT DOCUMENTS

| | | | |
|---|---|---|---|
| 3,248,254 A * | 4/1966 | Zenk ...................... | C08G 18/08 428/343 |
| 8,455,090 B2 | 6/2013 | Schmidt et al. | |
| 2004/0106726 A1* | 6/2004 | Joshi .................. | C08G 18/0885 524/589 |
| 2008/0265201 A1 | 10/2008 | Spyrou et al. | |
| 2013/0045652 A1 | 2/2013 | Schmidt et al. | |
| 2014/0065911 A1 | 3/2014 | SSchmidt et al. | |
| 2014/0087613 A1 | 3/2014 | Spyrou et al. | |

FOREIGN PATENT DOCUMENTS

| | | |
|---|---|---|
| DE | 102009001806 A1 | 9/2010 |
| DE | 102009001793 A1 | 10/2010 |
| DE | 102010029355 A1 | 12/2011 |
| DE | 102011006163 A1 | 9/2012 |
| WO | WO-2011/147688 A1 | 12/2011 |

OTHER PUBLICATIONS

"Dow Polyurethanes—Functionality, OH Number, and Equivalent Weight Definitions", provided by the Dow Answer Center (no date).*
International Search Report for PCT/EP2014/057490 dated Jul. 17, 2014.

* cited by examiner

*Primary Examiner* — Michael J Feely
(74) *Attorney, Agent, or Firm* — K&L Gates LLP

(57) ABSTRACT

The invention relates to prepregs and to a method for producing storage-stable polyurethane prepregs (pre-impregnated fibers) using polyols with a high content of secondary hydroxyl end groups, to composite fiber components (composite components) which are produced from the prepregs and which can be obtained by impregnating fiber-shaped materials such as woven fabrics and fleece, and to a method for producing said composite fiber components.

3 Claims, No Drawings

POLYURETHANE PREPREG AND COMPOSITE FIBER ELEMENT PRODUCED THEREFROM

CROSS-REFERENCE TO RELATED APPLICATIONS

This application is a national stage application (under 35 U.S.C. § 371) of PCT/EP2014/057490, filed Apr. 14, 2014, which claims benefit of European Application No. 13164574.9, filed Apr. 19, 2013, both of which are incorporated herein by reference in their entirety.

The invention relates to prepregs and to a process for the production of storage-stable polyurethane prepregs (preimpregnated fibers) with use of polyols having a high proportion of secondary hydroxy end groups, and to fiber-composite components (composite components) produced therefrom which are obtainable via impregnation of fibrous materials such as woven fabrics and laid scrims, and also to a process for their production.

BACKGROUND OF THE INVENTION

Fiber-composite materials are in principle composed of a matrix material made of plastic and, comprised therein, natural or synthetic, organic or inorganic fibers. Because of the low density of fiber-composite components and their high stiffness and strength, they are widely used in aerospace, in vehicle construction, in mechanical engineering and in plant engineering, and also in sports equipment.

In the sector of continuous-fiber-reinforced fiber-composite components there are many different shaping processes, for example the resin transfer molding (RTM) process, in which laid fiber scrims are inserted into a mold and draped, the mold is closed, and the resin is then injected into the mold. The crosslinking of the resin in the mold is typically brought about via introduction of heat. A difficulty, and therefore a certain restrictive factor, in this process is the cutting-to-size and draping of the laid fiber scrims in the mold. The cutting-to-size of the individual layers of textile to fit the various mold geometries is very time-consuming and costly. Preformable fiber reinforcement systems with good handling properties would be desirable here.

Fiber-reinforced materials in the form of prepregs are already used in many industrial applications because they are convenient to handle and give increased efficiency during processing when comparison is made with the alternative wet-lay-up technology.

Requirements for the industrial use of prepregs are not only good handling, relatively long shelf lives at room temperature, but also relatively short cycle times and prepreg hardening temperatures that are low and relatively energy-efficient.

Resins that have the strength and simultaneously high toughness required for use for the production of composite components are polyesters, vinyl esters, and epoxy systems, and just a few others. These include polyurethane resins, which have the toughness and strength required in particular for use for the production of composite profiles, or for use in the pultrusion process. Polyurethane composites also have superior toughness when comparison is made with vinyl esters, unsaturated polyester resins (UPE) or UPE-urethane hybrid resins.

One of the preconditions placed upon the matrix components of a prepreg system is that the resins in what are known as the B-state are not tacky or are only very slightly tacky, but also that they have not completely hardened; instead, the requirement is that the resin matrix has been merely prepolymerized, i.e. it must remain fusible. "B-state" is therefore the term used for the partially polymerized matrix resin in the prepreg that can be stored but remains reactive. The extent of this partial polymerization is precisely that which renders the prepregs non-tacky or only very slightly tacky to the touch, at higher temperature and optionally under pressure allows remelting, and finally hardening, of the matrix resin. Requirements placed upon the crosslinked resin matrix are high interfacial adhesion in relation to the reinforcing materials and embedment components and where appropriate also in relation to other materials, for example metallic or ceramic materials. Other requirements in the crosslinked state are high chemical stability and heat resistance.

DE 102009001793, DE 102009001806, and DE 10201029355 disclose prepregs based on storage-stable (highly) reactive polyurethane composition. The polyisocyanates used here are in essence aliphatic and either have internal blocking (e.g. in the form of uretdione) and/or have blocking by external blocking agents. The disadvantage is that the hardening temperature is from 120° C. to 200° C., depending on the system, and the hardening time/cycle time is very long, being up to 60 minutes, with resultant high energy costs and production costs. Furthermore, the glass transition temperatures obtained when aliphatic polyurethane systems are used are lower than with aromatic systems.

BRIEF SUMMARY OF THE INVENTION

The object of the present invention was to find a matrix material which has very low viscosity, in order to ensure good wetting of the fibrous support, and which has a sufficiently long pot life between the mixing of the components and the impregnation of the reinforcing fibers by the not yet fully reacted matrix material. Another object of the invention was to provide prepregs which can be produced by a simple process, are storage-stable for a number of weeks in what is known as the B-state at room temperature, have low hardening temperatures, and harden rapidly, thus giving short cycle times. The prepregs are moreover intended to be almost tack-free, thus permitting easy further processing.

Surprisingly, it has now been found that the production of prepregs that are storage-stable but nevertheless reactive can be achieved via impregnation of reinforcing fibers with a very low-viscosity polyurethane system with high index, where these prepregs have an extremely short hardening time when comparison is made with existing prepreg systems. The prepregs of the invention have improved processing properties and shorter cycle times, when comparison is made with the prepregs described in DE-A 102010029355 (WO 2011/147688).

DETAILED DESCRIPTION OF THE INVENTION

The invention therefore provides prepregs comprising a sheet-like fiber layer impregnated with polyurethane (matrix material) that has not been completely hardened and that has NCO content of from 8% by weight to 16% by weight and a $T_g$ value below 40° C., preferably below 35° C. (measured in accordance with DIN EN ISO 53765-A-20), where the polyurethane that has not been completely hardened is obtainable from a reaction mixture composed of A) an isocyanate component selected from the group consisting of aromatic diisocyanates, aromatic polyisocyanates, and their polymeric homologs and blends thereof, B) a polyol component made of one or more polyester polyols having secondary hydroxy end groups, their content of secondary hydroxy end groups being from 40 mol % to 100 mol %, based on the total content of all hydroxy end groups in the polyol component, with a number-average OH number of from 15 to 1000 mg KOH/g and a number-average functionality of from 1.9 to 2.5, C) one or more latent catalysts which have catalytic activity at temperatures of from 50° to 100° C., D) optionally auxiliaries and/or additional substances, with the exception of polyepoxides, where the reaction mixture at 40 C has an initial viscosity of from 30 to 500 mPas (measured in accordance with DIN EN ISO 53019), preferably from 70 to 250 mPas, particularly preferably from 70 to 150 mPas, and the ratio of the number of NCO groups of component A) to the number of OH groups of component B) is preferably from 1.35:1 to 10:1, particularly preferably from 1.4:1 to 5.0:1.

The NCO value of the polyurethane that has not been completely hardened provides the proportion by weight of unreacted isocyanate groups in the polyurethane. The NCO value is determined over a period of a number of weeks. This NCO value is moreover an indicator of the shelf life of the prepregs.

The NCO value of the storage-stable prepregs is determined weekly over a period of 12 weeks. The NCO value of the prepregs of the invention is within the range of 8% by weight to 16% by weight, preferably from 10% by weight to 16% by weight, and very particularly preferably from 10% by weight to 14% by weight. The NCO value of the prepregs of the invention changes only very slightly over a period of 12 weeks, even without addition of external blocking agents or what are known as stoppers. The NCO value is determined in accordance with DIN EN ISO 14896:2009-07, Method A.

The invention further provides sheet-like fiber-composite components comprising at least one prepreg of the invention, where the prepreg(s) has/have been completely hardened.

The complete hardening preferably takes place at a temperature of from 80° C. to 140° C.

The present invention further provides a process for the production of the prepregs of the invention which is characterized in that i) components A) to D) are mixed at temperatures of from 10° to 80° C., preferably from 20° C. to 50° C., for the production of a reactive mixture, where the definitions of components A) to D) are as follows A) an isocyanate component selected from the group consisting of aromatic diisocyanates, aromatic polyisocyanates, and their polymeric homologs and blends thereof, B) a polyol component made of one or more polyester polyols having secondary hydroxy end groups, their content of secondary hydroxy end groups being from 40 mol % to 100 mol %, based on total content of all hydroxy end groups in the polyol component, with a number-average OH number of from 15 to 1000 mg KOH/g and a number-average functionality of from 1.9 to 2.5, C) one or more latent catalysts which have catalytic activity at temperatures of from 50° to 100° C., D) optionally auxiliaries and/or additional substances, with the exception of polyepoxides, where the reaction mixture at 40 C has an initial viscosity of from 30 to 500 mPas (measured in accordance with DIN EN ISO 53019), preferably from 70 to 250 mPas, particularly preferably from 70 to 150 mPas, and the ratio of the number of NCO groups of component A) to the number of OH groups of component B) is preferably from 1.35:1 to 10:1, particularly preferably from 1.4:1 to 5.0:1, ii) the reactive mixture from 3 is applied to a sheet-like fiber layer and cures to some extent.

The fiber layer is therefore impregnated by the reactive mixture.

The invention further provides a process for the production of the fiber-composite components of the invention which is characterized in that one or more prepregs produced by the process of the invention is/are completely hardened at from 80° C. to 140° C., preferably at from 110° C. to 140° C., and a pressure of from 1 to 100 bar, preferably from 1 to 50 bar, and particularly preferably from 1 to 10 bar, or in vacuo within from 1 to 4 minutes, preferably from 1 to 3 minutes.

The viscosities are determined in accordance with DIN EN ISO 53019 (plate-on-plate).

The prepregs of the invention or the fiber-composite components produced therefrom can be used in various applications in the sector of the construction industry, of the automobile industry (e.g. bodywork components), of the aerospace industry (aircraft construction), of road construction (e.g. manhole covers), of power engineering (wind turbines; e.g. rotor blades), in boatbuilding and shipbuilding, and in highly loaded structures.

The principle of the impregnation process for the production of the prepregs is that firstly a homogeneous reactive polyurethane composition made of components A) to D) is produced at temperatures below 80° C. (preferably from 10° to 75° C.), and is then directly, at the mixing temperature of <80° C. or optionally after cooling, applied at room temperature to the fibrous support (sheet-like fiber layer), i.e. the fibrous support is impregnated by the polyurethane system produced from A), B), C), and D). The storable prepregs can then be further processed at a subsequent juncture to give fiber-composite components. The very low-viscosity polyurethane system of the invention provides very good impregnation of the fibrous support. Operation at room temperature avoids any further crosslinking reaction caused by heating of the polyurethane composition. Various variants of the impregnation procedure can be used. The polyurethane system can by way of example be applied on a roll mill or by means of a doctor.

An advantage of the reaction mixtures used in the invention is the mixing of components A), B), C), and D) at low temperatures of from 10° C. to 80° C., preferably from 20° C. to 60° C., and particularly preferably from 20° C. to 40° C.; it is thus possible to avoid any accumulation of exothermic heat, and the viscosity of the reaction mixture remains low, and the mixture can therefore be applied successfully to the support material. The systems used hitherto require mixing of the components at temperatures from 80° C. to 120° C.; incipient reaction of the reactive matrix material makes this problematic.

In contrast to the reaction mixtures used in DE-A 102010029355, DE-A 102009001793, and DE-A 102009001806, the reaction mixtures used in the invention do not require either external blocking agents or blocked isocyanate components. The reaction mixtures used in the invention permit rapid hardening of the prepregs at low temperatures and rapid manufacture of the fiber-composite components.

The reaction mixture used in the invention can be produced in casting machines with static mixers or with dynamic mixers, since only a short mixing time is required. This is highly advantageous in the production of the fiber-composite components of the invention, since for good saturation the reactive resin mixture requires minimal viscosity. A mixture that requires some minutes of premixing intrinsically has excessively high viscosity caused by the formation of urethane groups.

The prepregs produced in the invention have a very high shelf life of a number of weeks at room temperature. The prepregs thus produced are flexible and almost tack-free, and can therefore be further processed with ease.

The shelf life of the prepregs is determined by determining the NCO value over a period of a number of weeks. The NCO value provides the proportion by weight of isocyanate groups in the isocyanate mixture, or in the prepolymer.

The NCO value of the storage-stable prepregs is determined weekly over a period of 12 weeks. The NCO value of the prepregs of the invention is within the range of 8% by weight to 16% by weight, preferably from 10% by weight to 16% by weight, and very particularly preferably from 10% by weight to 14% by weight. The NCO value of the prepregs of the invention is within the stated limiting ranges over a period of 12 weeks, even without addition of external blocking agents or what are known as stoppers. The NCO value (in % by weight) is determined in accordance with DIN EN ISO 14896:2009-07, Method A.

Another advantage of the reaction systems used in the invention when comparison is made with the polyurethane systems of DE-A 102010029355, DE 102009001793, and DE 102009001806 is that use of aromatic polyisocyanates gives fiber-composite components with high glass transition temperatures above 130° C., and that hardening can be achieved at low temperatures.

The prepregs can be processed in the form of a layer, and in the form of a number of mutually superposed layers, to give a fiber-composite component. Before the crosslinking of the matrix material it is preferable that the prepregs are cut to size, where appropriate stitched or otherwise fixed, and processed in a suitable mold in a press at superatmospheric or atmospheric pressure, or where appropriate with application of vacuum. For the purposes of the present invention, this procedure for the production of the fiber-composite components from the prepregs takes place at temperatures below 140° C., preferably from 110° to 140° C., particularly preferably from 110° to 135° C., depending on hardening time.

During the processing of the prepregs to give the fiber-composite components (e.g. via processing in a press at elevated temperatures) melting of the initially incipiently reacted matrix material to give a low-viscosity polyurethane composition provides very good impregnation of the fibrous reinforcing material before the complete crosslinking reaction of the polyurethane composition at elevated temperatures cures the entire polyurethane matrix. It is preferable that, before the pressing process of the prepreg, a release agent is provided to the mold cavity. Before the introduction of the fiber material into the mold for the production of the prepreg, it is possible to introduce further protective layers or decorative layers, for example one or more gelcoat layers.

Particular preference is given to a fiber-composite component which has, in the fiber layer, a polyurethane obtainable from 45-80% by weight, preferably from 50-70% by weight, of polyisocyanates (A), from 25-50% by weight, preferably from 30-45% by weight, of polyols (B), from 0.1-3% by weight, preferably from 0.3-1.4% by weight, of catalyst (C), and from 0-3% by weight, preferably from 0-1.5% by weight, of additives (D), where the sum of the proportions by weight of the components is 100% by weight.

The proportion of fiber in the fiber-composite part is preferably more than 45% by weight, particularly preferably more than 50% by weight, based on the total weight of the fiber-composite component.

The usual aromatic di- and/or polyisocyanates are used as polyisocyanate component A). Examples of these suitable polyisocyanates are phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) and/or higher homologs (pMDI), 1,3- and/or 1,4-bis(2-isocyanatoprop-2-yl)benzene, (TMXDI), and 1,3-bis(isocyanatomethyl)benzene (XDI). Isocyanate used preferably comprises diphenylmethane diisocyanate (MDI) and in particular mixtures of diphenylmethane diisocyanate and polyphenylene polymethylene polyisocyanate (pMDI). The preferred monomer content of the mixtures of diphenylmethane diisocyanate and polyphenylene polymethylene polyisocyanate (pMDI) is from 60 to 100% by weight, preferably from 70 to 95% by weight, particularly preferably from 80 to 90% by weight. The NCO content of the polyisocyanate used should preferably be above 25% by weight, with preference above 30% by weight. The viscosity of the isocyanate should preferably be ≤250 mPas (at 25° C.), with preference ≤100 mPas (at 25° C.), and with particular preference ≤30 mPas (at 25° C.).

When a single polyol is added, the OH number of component B) is the OH number of said polyol. In the case of mixtures, the number-average OH number is stated. This value can be determined by reference to DIN EN ISO 53240.

The OH number (OHN), or where appropriate average OHN, of the polyol component (polyol or polyol mixture) B) is from 15 to 1000 mg KOH/g, preferably from 50 to 400 mg KOH/g, and particularly preferably from 60 to 300 mg KOH/g. It is preferable that the number-average functionality of the polyol component used is from 1.9 to 2.5. For the purposes of this application, the term functionality means the number of NCO-reactive groups per molecule.

The following can be used as polyol component B) in the invention: polyether polyols, polyester polyols, polyether-ester polyols, or polycarbonate polyols, preference being given to polyester polyols. Polyester polyols that can be used in the invention are preferably condensates of low-molecular-weight polycarboxylic acids and/or their derivatives (hereinafter termed polycarboxylic acids) (1) and polyol components (2). The low-molecular-weight polycarboxylic acids (1) can be aliphatic or aromatic. They are preferably selected from the following group:

succinic acid, fumaric acid, amide acid, maleic anhydride, glutaric acid, adipic acid, sebacic acid, suberic acid, azeleic acid, 1,10-decanedioic acid, 1,12-dodecanedioic acid, phthalic acid, phthalic anhydride, isophthalic acid, terephthalic acid, pyromellitic acid, and trimellitic acid, and where appropriate dialkyl ester derivatives thereof, and also internal anhydrides (lactones), for example caprolactone.

It is also possible, of course, to use mixtures of these low-molecular-weight polycarboxylic acids (1) with one another or with other polycarboxylic acids (1), and in the latter case here it is preferable that the polycarboxylic acids (1) mentioned contribute at least 90 mol % of all of the carboxy groups.

The polycarboxylic acids (1) that can be used in the invention are either obtainable commercially or can easily be obtained via syntheses known to the person skilled in the art.

The diol components (2) to be reacted with the polycarboxylic acids (1) are preferably composed of, based on the entirety of the dial component (2), from 50% by weight to 100% by weight, particularly from 70% by weight to 100% by weight, very particularly from 80% by weight to 100% by weight, of low-molecular-weight diols in each case having one or two secondary hydroxy groups (2a). The low-molecular-weight dials in each case having one or two secondary hydroxy groups (2a) in particular have from 3 to 18 carbon atoms, preferably from 3 to 12. The low-molecular-weight dials that can be used in the invention having one or two secondary hydroxy groups (2a) are preferably selected from the group of propylene 1,2-glycol, homologs of propylene 1,2-glycol (e.g. dipropylene glycol, tripropylene glycol, tetrapropylene glycol, etc.), 2,3-butanediol, 1,2-pentanediol, 3-hexyne-2,5-diol, 1,2-, 1,3-, and 1,4-cyclohexanediol, and all of the stereoisomers of dianhydrosorbitol.

It is also possible, of course, to use mixtures of these dials (2a) with one another or with other diols or with higher-functionality alcohols (2b).

Higher-functionality alcohols (2b) can by way of example be 1,1,1-trimethylolpropane, pentaerythritol, or glycerol.

The polyol components (2c) required in each case to make up 100% by weight can derive from the group consisting of ethylene glycol, diethylene glycol, triethylene glycol, and higher homologs of ethylene glycol, 1,3-propanediol, 1,4-butanediol, 1,5-pentanediol, 1,6-hexanediol, 1,8-octanediol, 1,10-decanediol, and 1,12-dodecanediol.

The polycarboxylic acids (1) are reacted with the diol component (2) via the polycondensation reaction, or if lactones are used polyaddition reaction, known to the person skilled in the art.

It is, of course, also possible that all of the starting components used, including not only the polyol components but also the polycarboxylic acids, are based on biological sources.

The polyol component B) can also comprise fibers, fillers, and polymers.

Latent catalysts C) used are preferably catalysts that have catalytic activity in the range from 50° C. to 100° C. Examples of typical latent catalysts are blocked amine and amidine catalysts from Air Products (for example Polycat® SA-1/10, Dabco KTM 60) and Tosoh Corporation (for example Toyocat® DB 2, DB 30, DB 31, DB 40, DB 41, DB 42, DB 60, DB 70). However, it is also possible to use any of the other typical latent catalysts used in polyurethane chemistry with what is known as a switch temperature of from 50° C. to 100° C., Auxiliaries and/or additional substances (additives) D) can optionally be added. These are by way of example deaerators, antifoams, release agents, fillers, flow aids, organic or inorganic dies, blowing agents, and reinforcing materials. Other known additives and additions can be used if required. Polyepoxides are not used.

Fiber material used can be sized or unsized fibers, for example glass fibers, carbon fibers, metal fibers (e.g. steel fibers or iron fibers), natural fibers, aramid fibers, polyethylene fibers, basalt fibers, or carbon nanotubes (CNTs). Particular preference is given to carbon fibers. The fibers can be used in the form of short fibers with length from 0.1 to 50 mm. Preference is given to continuous-fiber-reinforced composite components obtained by using continuous fibers. The arrangement of the fibers in the fiber layer can be unidirectional, random, or woven. In components with a fiber layer made of a plurality of sublayers, there may be sublayer-to-sublayer fiber orientation. It is possible here to produce unidirectional fiber layers, crosslaid layers, or multidirectional fiber layers, where unidirectional or woven sublayers are mutually superposed. Particular preference is given to semifinished fiber products in the form of fiber material which is, for example, woven fabrics, laid scrims, braided fabrics, mats, nonwovens, knitted fabrics, or 3D semifinished fiber products.

The fiber-composite components of the invention can be used by way of example for the production of bodywork components of automobiles, or in aircraft construction, or rotor blades of wind turbines, or for the production of components for the construction of buildings or of roads (e.g. manhole covers), and other highly loaded structures.

The examples below are intended to provide further explanation of the invention.

EXAMPLES

Production of Polyol Component B) Having about 66 Mol % of Secondary Hydroxy End Groups: Polyol 1

985 g (6.74 mol) of adipic acid (in the terminology of this application (1), i.e. a polycarboxylic acid (1)), 757 g (9.95 mol) of propylene 1,2-glycol (in the terminology of this application (2a), which in this case is the sole constituent of the diol component (2)), and 30 mg (20 ppm) of tinII chloride dihydrate are used as initial charge under nitrogen in a 2 liter 4-necked flask equipped with heating mantle, mechanical stirrer, internal thermometer, 40 cm packed column, column head, inclined high-performance condenser, and membrane vacuum pump, and heated to 200° C. over the course of 3 hours, with stirring, whereupon water was removed by distillation at an overhead temperature of 100° C. The internal pressure was then lowered slowly to 160 mbar over the course of 3 hours, and the reaction was continued for a further 40 hours for completion. The hydroxy number was determined as 158.0 mg KOH/g, 74.1 g (0.97 mol) of propylene 1,2-glycol were then added, and the mixture was equilibrated for 5 hours at atmospheric pressure and 200° C.

Analysis of Polyol 1:
  Hydroxy number: 221 mg KOH/g
  Acid number: 0.45 mg KOH/g
  Viscosity: 195 mPas (50° C.)
  Secondary OH groups about 66 mol %

Production of Comparative Polyol Component B) Having about 33 Mol % of Secondary Hydroxy End Groups: Polyol 2

2649 g (18.13 mol) of adipic acid (in the terminology of this application (1), i.e. a polycarboxylic acid (1)), 821 g (10.79 mot) of propylene 1,2-glycol (in the terminology of this application (2a)), 1182 g (15.53 mol) of propylene 1,3-glycol (in the terminology of this application (2c)), and 80 mg (20 ppm) of tinII chloride dihydrate are used as initial charge under nitrogen in a 2 liter 4-necked flask equipped with heating mantle, mechanical stirrer, internal thermometer, 40 cm packed column, column head, inclined high-performance condenser, and membrane vacuum pump, and heated to 200° C. over the course of 3 hours, with stirring, whereupon water was removed by distillation at an overhead temperature of 100° C. The internal pressure was then towered slowly to 160 mbar over the course of 3 hours, and the reaction was continued for a further 60 hours for completion. The hydroxy number was determined as 223.0 mg KOH/g.

Analysis of polyol 2:
  Hydroxy number: 223 mg KOH/g
  Add number: 0.86 mg KOH/g
  Viscosity: 180 mPas (50° C.)
  Secondary OH groups: about 33 mol %
  The proportion of secondary OH end groups was determined by NMR spectroscopy.

General Production Specification:

Storage-stable prepregs were produced from the systems of the invention made of polyisocyanates, polyols, additives, and latent catalysts, and were then hardened to give a fiber-composite component. The fiber-reinforced prepregs were produced via impregnation by distributing a thin film of the polyurethane system of the invention onto the woven glass fiber fabric and distributing same on the surface so as to achieve a glass fiber content of about 55% by weight, based on the subsequent component. The prepregs were then packed in a vacuum bag and stored at room temperature. The prepregs were taken out of the hag and then processed in a press at 130° C. and 5 bar to give a fiber-composite component within a period of two minutes. The glass fiber content was determined via ashing of the test sample in accordance with DIN EN ISO 1172.

The NCO/OH ratio provides the ratio of the number of NCO groups in polyisocyanate component A) to the number of OH groups in component B).

Starting Compounds Used:

Component A): Desmodur® VP.PU 60RE11 (polyisocyanate from Bayer MaterialScience AG; mixture of diphenylmethane diisocyanate and polyphenylene polymethylene polyisocyanate; NCO content 32.6% by weight; viscosity at 25° C.: 20 mPas)

Component B): linear polyester polyol made of adipic acid and propylene 1,2-glycol, hydroxy number about 220 mg KOH/g and functionality 2, viscosity at 25° C.: 985±50 mPas Component C): Toyocat® DB 40: latent catalyst (blocked amine) from TOSOH Corporation, switch temperature about 70° C.

Woven glass fiber fabric: HPT 1040-E0/3AC11, 90°/0° from SGL KÜMPERS GmbH & Co. KG, weight per unit area 1036 g/m²

Test Equipment and Standards Used:
  DSC: DSC Q 20 V24.8 Build 120 from Texas Instruments
  Viscosity in accordance with DIN EN ISO 53019 (d/dt=60 1/s): d/dt=shear rate (viscometer: MCR 501 from Anton Paar)
  NMR: NMR spectrometer from Bruker DPX 400 (solvent: chloroform-d1)
  DIN EN ISO 53765-A-20: A-20=Determination of glass transition temperature using a temperature change of 20 Kelvin/second
  DIN EN ISO 14896:2009-07 Method A: Method A=Determination of NCO value by titration Inventive Example 1

184.1 g of component A) were mixed at room temperature with 120.0 g of polyol component B) (polyol 1) and 2.9 g of Toyocat® DB 40 at room temperature, and homogenized in a high-speed mixer. A thin film of this mixture was then applied to a woven glass fiber fabric and distributed on the surface. The NCO value of the prepreg after 24 hours was 13.0%. The prepreg was then processed in a press at 130° C. and 5 bar to give a fiber-composite component.

Comparative Example 2

186.6 g of component A) were mixed at room temperature with 120 g of polyol component B) (polyol 2) and 2.9 g of Toyocat® DB 40 at room temperature, and homogenized in a high-speed mixer. The NCO value of the reaction mixture was adjusted to 13%. The high reactivity and the very rapid viscosity rise prevented production of a prepreg. After 30 seconds, the reaction had consumed almost all of the reaction mixture. The NCO value of the prepreg after 2 hours was 5%.

Comparative Example 3

The comparative data are derived from DE-A 102010029355 (inventive example 1), and can be found in DE-A 102010029355 under the heading "Lagerstabilität der Prepregs" [Shelf life of the prepregs].

Comparative Example 4

155.7 g of component A) were mixed at room temperature with 120 g of polyol component B) (polyol 1) and 2 g of DY 9577® (trichloro(N,N-dimethyloctylamine)boron from Huntsman Corporation, m.p. from 25-36° C., switch temperature about 120° C.), and homogenized in a high-speed mixer. A thin film of this mixture was then applied to a woven glass fiber fabric and distributed on the surface. The NCO value of the prepreg after 24 hours was 11%. The prepreg was then processed in a press at 130° C. and 5 bar to give a fiber-composite component.

TABLE 1

| Examples | Inventive example 1 | Comparative example 2 | Comparative example 3 | Comparative example 4 |
|---|---|---|---|---|
| NCO/OH equivalent ratio | 2.98:1 | 2.95:1 | 1:1 | 2.32:1 |
| viscosity at 40° C. (directly after mixing) [mPas]; measured in accordance with DIN EN ISO 53019 (d/dt = 60 1/s) | 10 mPas | not measurable, because too reactive | no homogeneous melt, because melting point of Fineplus ® PE 8078 >60° C. | 10 mPas |
| Shelf life of prepreg [after days]; measured on the basis of glass transition temperature $T_g$ [° C.] in accordance with | after 7 days: −6<br>after 14 days: −3.1<br>after 28 days: 1<br>after 49 days: 6.6<br>after 56 days: 6.1 | after 2 hours: 88 | after 2 days: 50<br>after 17 days: 55<br>after 30 days: 56<br>after 47 days: 55 | after 7 days: −9.3<br>after 14 days: −9.6<br>after 28 days: −9.1<br>after 49 days: −7.9<br>after 77 days: −4.2 |

TABLE 1-continued

| Examples | Inventive example 1 | Comparative example 2 | Comparative example 3 | Comparative example 4 |
|---|---|---|---|---|
| DIN EN ISO 53765-A-20 NCO value of prepreg [after days]; measured on accordance with DIN EN ISO 14896:-2009-07, Method A [% by wt.] | after 84 days: 8.4<br>after 1 day: 13.0<br>after 14 days: 12.7<br>after 28 days: 12.3<br>after 49 days: 11.4<br>after 56 days: 11.0<br>after 84 days: 10.4 | after 2 hours: <5 | — | after 84 days: −4.1<br>after 7 days: 10.5<br>after 14 days: 10.7<br>after 28 days: 10.6<br>after 49 days: 10.7<br>after 77 days: 10.5<br>after 84 days: 10.5 |
| Solidification time | 2 min at 130° C. | — | 30 min; in this time the temperature is raised from 90° C. to 170° C. | >20 minutes |
| Glass fiber content [% by wt.] in accordance with DIN EN ISO 1172 | 55 | — | >50 | 55 |

The shelf life of the prepregs was determined on the basis of the glass transition temperature ($T_g$) by means of DSC studies, and also on the basis of the NCO value [in % by weight]. The values in Table 1 show that the prepreg of the invention retained its capability for crosslinking over storage far a period of 12 weeks at room temperature.

The solidification time is the time at which the crosslinking of the polyurethane composition is so complete that no further enthalpy of reaction for the crosslinking reaction is detectable.

The viscosity of the system of inventive example 1 of the invention directly after mixing of the individual components A) to D) was very low, about 10 mPas at 40° C., whereas the system described in comparative example 3 was solid below 60° C., and first had to be melted before the impregnation step. It was consequently significantly more difficult to obtain good impregnation of the fibers in comparative example 3. The solidification time was moreover significantly shorter in the system of the invention, about 2 min at 130° C., than in the system of comparative example 3.

Comparative example 2 used polyol 2, having 33 mol % of secondary OH end groups, instead of polyol 1, having 66 mol % of secondary OH end groups. The molar quantity of latent catalyst Toyocat® DB 40 remained unchanged. The resultant reaction mixture was almost completely consumed by the reaction within 30 seconds at room temperature, and it was therefore impossible to produce a prepreg. Because the reaction mixture was consumed in the reaction it was also impossible to reach a B-state which can be remelted at elevated temperature. After as little as 2 h at room temperature the glass transition temperature of the reaction mixture was 88° C. and the NCO value was below 5%.

In comparative example 4 the latent catalyst Toyocat® DB 40, with switch temperature about 70° C., was replaced by a corresponding molar quantity of the latent catalyst DY 9577®, with switch temperature about 120° C. When this catalyst was used, the pot life of the reaction mixture was >24 hours, and even after a week at room temperature the B-state required for prepregs had not been entirely achieved, because the matrix was very tacky, rather than almost tack-free as desired. The hardening time of the prepregs of comparative example 4, over 20 minutes at 130° C., was many times longer than that of inventive example 1.

In what is known as the B-state, the prepregs of the invention were almost tack-free and very flexible, could easily be cut to size, and could be draped successfully into the mold. The shelf life of the system of the invention was moreover at least 12 weeks.

What is claimed is:

1. A prepreg comprising a sheet-like fiber layer impregnated with polyurethane (matrix material) that has not been completely hardened and that has NCO content of from 8% by weight to 16% by weight and a $T_g$ value below 40° C., measured in accordance with DIN EN ISO 53765-A-20, where the polyurethane that has not been completely hardened is obtained from a reaction mixture comprising
   A) an isocyanate component selected from the group consisting of aromatic diisocyanates, aromatic polyisocyanates, and their polymeric homologs and blends thereof,
   B) a polyol component made of one or more polyester polyols having secondary hydroxy end groups, wherein the content of secondary hydroxy end groups is from 40 mol % to 100 mol %, based on the total content of all hydroxy end groups in the polyol component, with a number-average OH number of from 15 to 1000 mg KOH/g and a number-average functionality of from 1.9 to 2.5,
   C) one or more latent catalysts which have catalytic activity at temperatures of from 50° to 100° C.,
   D) optionally auxiliaries and/or additional substances, with the exception of polyepoxides, wherein the reaction mixture at 40° C. has an initial viscosity of from 30 to 500 mPas measured in accordance with DIN EN ISO 53019, and the ratio of the number of NCO groups of component A) to the number of OH groups of component B) is from 1.35:1 to 10:1.

2. A process for the production of the prepreg as claimed in claim 1, comprising
   i) mixing components A) to D) at a temperature of from 10° to 80° C. for the production of a reactive mixture, and
   ii) applying the reactive mixture from i) to a sheet-like fiber layer and curing to some extent.

3. A process for the production of a fiber-composite component comprising: completely hardening one or more prepreg(s) at a temperature of from 80° C. to 140° C. and a pressure of from 1 to 100 bar or in vacuo within from 1 to 4 minutes; wherein the one or more prepreg(s) is one or more prepeg(s) accordingly to claim 1.

* * * * *